United States Patent [19]

Galloway

[11] 3,842,336

[45] Oct. 15, 1974

[54] BALANCING ASSEMBLY FOR PARALLELLED RECTIFIERS

[75] Inventor: James H. Galloway, New Baltimore, Mich.

[73] Assignee: Oxy Metal Finishing Corporation, Warren, Mich.

[22] Filed: Oct. 5, 1973

[21] Appl. No.: 404,097

[52] U.S. Cl. .............................. 321/27 R, 321/8 R
[51] Int. Cl. ......................................... H02m 7/00
[58] Field of Search ............................. 321/8, 27 R

[56] References Cited
UNITED STATES PATENTS

| | | | |
|---|---|---|---|
| 3,223,901 | 12/1965 | Riley .............................. | 321/8 R X |
| 3,289,068 | 11/1966 | Healis ............................. | 321/8 R |
| 3,460,022 | 8/1969 | Riley .............................. | 321/8 R |
| 3,502,956 | 3/1970 | Fries et al. ..................... | 321/8 R |
| 3,504,268 | 3/1970 | Hoffmann et al. ............... | 321/11 |
| 3,805,140 | 4/1974 | Takahashi et al. ............... | 321/8 R |

*Primary Examiner*—William M. Shoop
*Attorney, Agent, or Firm*—Harness, Dickey & Pierce

[57] ABSTRACT

A rectifier assembly which incorporates a plurality of parallelled rectifier devices, such as thyristors, wherein the inductance of the various parallelled legs are forced to be approximately equal. This is accomplished by creating an equal self-inductance component by insuring that the area enclosed within any conductive path including a single leg is equal to the area enclosed within a conductive path of any other single rectifier leg. Further, the assembly is provided with an additional end turn in the buss work which causes the end leg of the ladder network of parallelled rectifier devices to react as though it were in the center of an infinite string of parallelled rectifier devices. The purpose of the foregoing abstract is to enable the Patent Office and the public generally, and especially the scientists, engineers or practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

20 Claims, 7 Drawing Figures

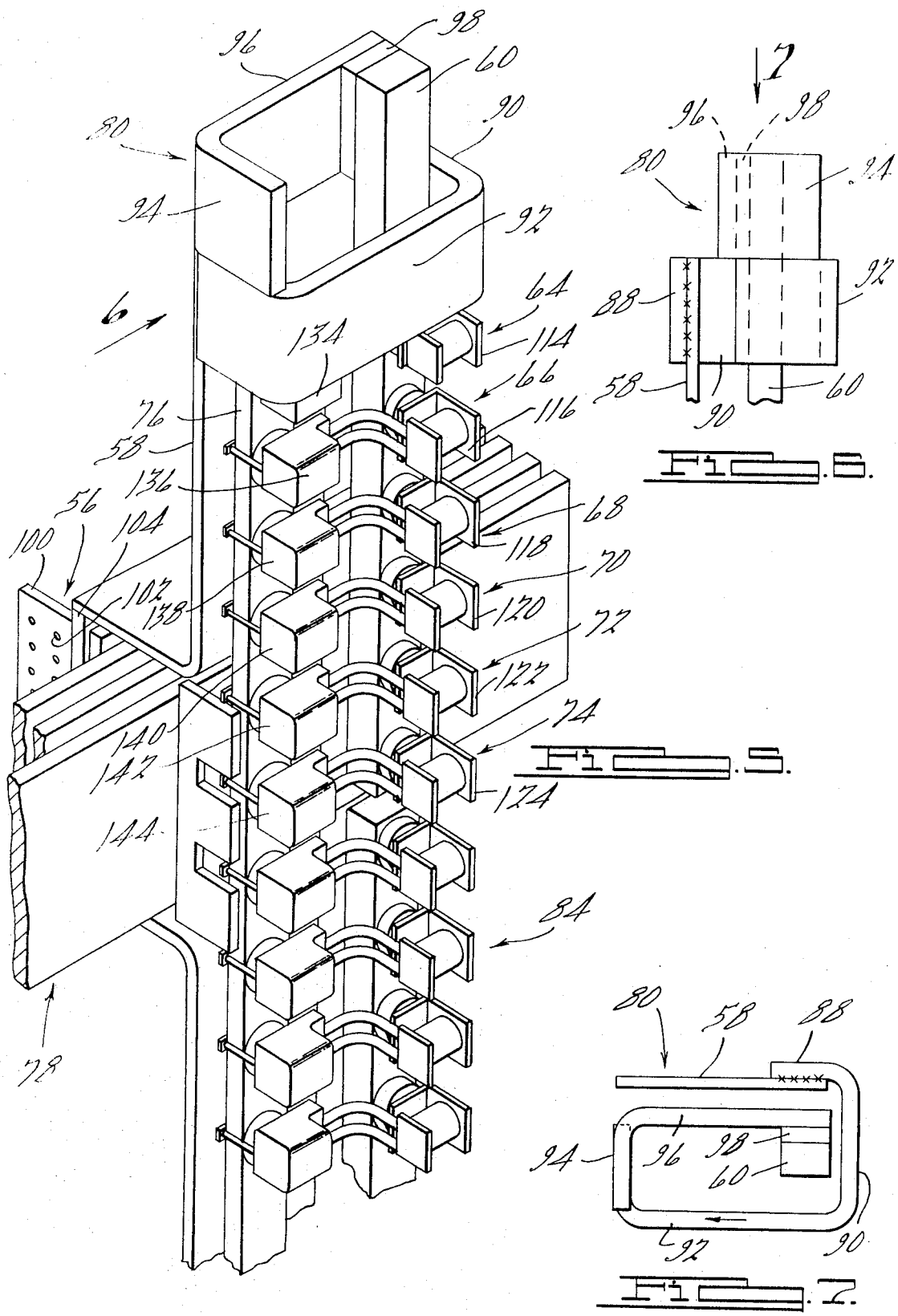

BALANCING ASSEMBLY FOR PARALLELLED RECTIFIERS

BACKGROUND AND SUMMARY OF THE DEVELOPMENT

This invention relates generally to a system for equalizing the inductive impedance of parallelled rectifier legs in a ladder network of rectifier devices and more particularly to equalizing the self-inductance and mutual inductance for each leg of a plurality of parallelled legs of rectifier devices in a rectifier power supply to insure that the current is shared equally in each of the parallelled legs.

In rectifier assemblies which are utilized to rectify the energy being supplied from an alternating current power supply wherein it is desired to draw a large amount of current, such as in rectifiers for chlorine production and rectifiers used in other electro-chemical processes, it has been necessary to parallel many diodes, thyristors, or controlled rectifiers in each circuit leg in order to carry the required current to accomplish the electro-chemical process. This is due to the fact that rectifier devices which are required to carry the large magnitude of current described above would be unduly expensive or are practically unavailable. It has been the practice in the past to parallel devices of this type to share the required current load in each phase.

However, in parallelling devices of this type, it has been found that the shared current carried by each leg is generally unequal due to a large number of factors. For example, the voltage drop across any parallelled leg of the circuit is made up of the combined resistive drop of the buss work and the forward drops of the rectifier devices. Further, the impedance includes an inductive component which is due in part to the self-inductance of the parallelled leg and to the mutual inductance of that leg due to the influence of other current carrying legs in the proximity of the leg under consideration. In large current carrying systems of the type described, the inductive impedance of the current carrying path may be much larger than the resistive impedance for that path thereby creating unusual problems in requiring each path to share equally the load current for that particular phase or circuit leg.

As will be seen from a description of the drawings, it has been found that the current distribution in a plurality of parallelled legs varies considerably wherein the center legs in a ladder network will carry much less current than the extreme outer legs and it has further been found that the outer legs may differ, one from the other, depending on the feed and collection configuration for the current. This generally low current in the center legs is due to the mutual inductance distribution of one leg relative to another and the difference between the current carrying characteristics of the outer legs is due, in part, to the manner in which the current is fed to the ladder network and the manner in which the collective current is withdrawn from the ladder network.

More specifically, it has been found that the current distribution in a parallelled ladder network is greatly effected by the higher mutual inductance of the center path due to the effect of the legs on either side of a center path thereby causing the current to crowd to the outside paths of the network. Further, it has been found that the path closest to the distribution or input side will have a larger self-inductance, thereby lowering the current carrying capabilities of this path, relative to the legs closest to the collection or output side of the assembly. Thus, the collection side will have a lower effective impedance, and thus higher current, relative to the distribution side.

Certain approaches have been suggested for solving these problems. For example, it has been proposed to use components having an excess rating relative to the current desired to be carried in each leg. In this way, the current carrying capabilities of each leg will not be exceeded due to current distribution. However, the disadvantage of this solution is that the components would be excessively expensive due to the necessity of supplying components for the rectifier system which far exceed that required.

A second solution which has been proposed is to tap the incoming and outgoing buss connections in such a way that the end legs are provided with a higher self-inductance. This higher self-inductance will compensate for the lower mutual inductance at the ends and thus compensate for the uneven distribution of current throughout the network. The disadvantage of this solution involves the complicated connections necessary to accomplish the adjustment of the self and mutual inductance. These complications lie in the calculations necessary to accommodate the various sizes of rectifiers supplied and also the mechanical awkwardness of providing connections of this type.

A third solution has been suggested wherein all diode paths are arranged in a circular symmetrical pattern, referred to as a pinwheel arrangement, which arrangement makes the self and mutual inductances of all paths equal by the sheer symmetry of the arrangement. Thus, any particular leg in the parallelled network would see the same number of additional legs to provide equal mutual inductance and the connection for each leg for distribution and collection of the current would equalize the self inductance. However, a pinwheel assembly is very bulky and almost impossible to water cool, both of which are distinct disadvantages.

A fourth solution involves placing a fixed reactor in series with each path, the reactor having an inductance of such a great magnitude that the effect of the path inductance is minimized and thereby swamped-out. The disadvantages of this assembly are obvious in the introduction of an excessive amount of reactive impedance in each leg with its attendant problems and the requirement for large and expensive fixed reactors which reactors are difficult to mount in the assembly.

A further approach to solving this problem involves the use of sharing transformers wherein transformer windings are incorporated in each leg of the parallelled conductive paths to force the current in each path to be equal. In the use of this concept, any path having a greater current load will cause, by transformer action, the current in an inductively coupled leg to be greater and force the current in the forced leg to be less. The disadvantage in this solution lies in the fact that the provision of sharing transformers creates a complicated assembly in that a large number of transformers must be provided, with the attendant cost, and the system must include some provision to avoid saturation of the cores of the current sharing transformers.

In accordance with the principles of the present invention, the aforementioned problems are solved without introducing the disadvantages detailed above by providing a particular configuration of distributing and collecting the current and a novel bussing assembly. The problem, and the attendant solution, has been divided into two parts, one part of which is designed to solve the disparity in self inductance and the second part being designed to solve the disparity in mutual inductance. In the case of the self-inductance, the alternating current input buss, the distribution buss, and the collector buss are positioned and configured to form an isosceles triangle thus maintaining the self-inductance contribution of each segment of each path equal.

As will be seen from a further discussion of this portion of the invention, each parallel leg path, with its associated input buss, distribution buss, and collector buss, encompasses a preselected area which is indicative of the self-inductance of that path. This area has been designed to be equal to the area encompassed by the alternating current buss, the distribution buss, and the collector buss for any other parallelled path. In this way, it will be seen that the self-inductance of each path is equal to the self-inductance of any other path. This configuration results in other advantages due to the fact that all currents return on themselves in a "hairpin" arrangement which results in the cancellation of external fields. Further, the particular bussing configuration for this portion of the solution to the aforementioned problem results in a constant length path through the buss work for any given rectifier leg, thereby balancing the resistive drop for any particular parallelled leg, including its associated buss work.

The second portion of the balancing solution results in making the mutual inductance terms for each parallelled path constant thereby balancing all of the mutual inductances for each path. As stated above, if the parallelled paths were formed as an infinitely long string of parallelled paths, the mutual inductance contribution seen by any one path due to all of the other paths would be the same as the mutual inductance seen by any other path due to the remaining paths. Taking for example the illustrated embodiment, which consists of six parallelled paths for each half wave of a particular phase, it can be considered that the end paths of this set of six paths are influenced by an external field which is generated by the rest of the remaining five paths. Thus, the uppermost path is influenced by the five remaining lower paths and there are no paths above the uppermost path which would influence that path from a mutual inductance standpoint. If it would be possible to generate a field which would simulate an infinite number of parallelled paths above the uppermost path illustrated, the paths in the finite string illustrated would behave as if they were part of a balanced infinite string.

In accordance with the principles of the present invention, the current which feeds the distribution buss is utilized to generate a field which would simulate the aforementioned infinite path field. This is accomplished by forming an end turn on the feed portion of the A.C. buss, which end turn is configured and positioned to simulate the field created by infinite paths of parallelled legs above the uppermost leg. This configuration will be more fully described hereinafter and will be seen to accomplish the principles of this portion of the invention. This arrangement may be symmetrically repeated at the bottom to simulate the field of an infinite string for the lower half of the assembly.

Accordingly, it is one object of the present invention to provide an improved balanced rectifier system.

It is another object of the present invention to provide an improved balanced rectifier system which does not use excessively rated components in the parallelled rectifier assembly.

It is a further object of the present invention to provide an improved balanced rectifier system which is not mechanically awkward to assemble.

It is a further object of the present invention to provide the balanced assembly described above which is simple to water cool and streamlined in configuration.

It is another object of the present invention to provide an improved balanced rectifier system which avoids the use of fixed reactors in the parallelled legs.

It is a further object of the present invention to provide an improved balancing system for a rectifier assembly which avoids the use of sharing transformers.

It is another object of the present invention to provide an improved rectifier system incorporating parallelled legs for current sharing wherein each leg of the parallelled rectifier system has equal self inductance.

It is another object of the present invention to provide an improved balanced rectifier system wherein the buss work is configured to form an isosceles triangle with the A.C. buss, the distribution buss, and the collector buss.

It is still a further object of the present invention to provide an improved rectifier system incorporating parallelled rectifier element wherein the area enclosed, and thus the self inductance, is equal for each path incorporating a parallelled rectifier element.

It is a further object of the present invention to provide an improved rectifier assembly having a balanced mutual inductance.

It is another object of the present invention to provide an improved rectifier assembly incorporating parallelled rectifier elements wherein the assembly includes a system for creating a field simulating an infinite string of parallelled rectifier elements, which field will influence the end paths of the parallelled finite string.

It is a further object of the present invention to provide a balanced mutual inductance system for a rectifier assembly having a plurality of parallelled rectifier elements wherein the buss work feeding the parallelled rectifier elements is utilized to create an infinite string field to influence the finite field created by the parallelled legs.

Further objects, features and advantages of this invention will become apparent from a consideration of the following description, the appended claims and the accompanying drawings in which:

FIG. 5 is a perspective view of a preferred form of bussing to accomplish the principles of the present invention;

FIG. 6 is a side view of the end turn taken along arrow 6 of FIG. 5; and

FIG. 7 is a plan view of the end turn taken along arrow 7 of FIG. 6.

Figure 1:
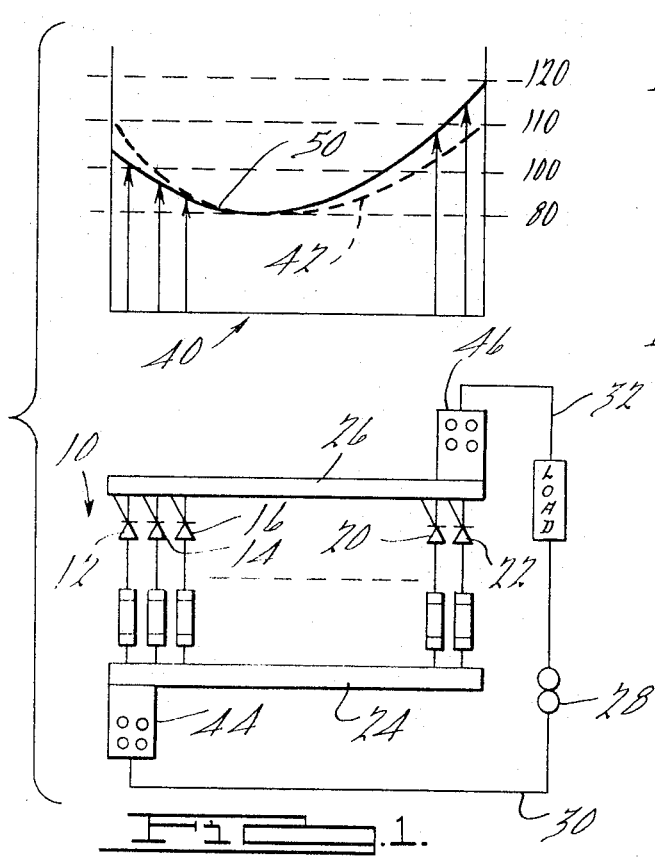
FIG. 1 is a composite illustration of the typical ladder network presenting the problems described above, the upper portion of the Figure being a graph illustrating the typical current distribution through the various parallelled rectifier elements.

Referring now to FIG. 1, there is illustrated a schematic diagram of a finite ladder network 10 of a plurality of discrete thyristor devices 12, 14, 16, 20, 22 connected between a distribution buss 24 and a collection buss 26. The busses 24, 26 are connected to either side of a source of alternating current potential at 28 by means of a conductor 30 connected to the distribution buss 24 and a conductor 32 connected to the collection buss 26. In the typical configuration, the collection buss forms one side of the direct current output buss and the other side of the D.C. buss work is connected to a center tap of the alternating current source. The source illustrated is a half wave rectifier single phase source.

The upper portion of FIG. 1 illustrates the current distribution across the various legs of the thyristor elements 12–22, the left side of the wave form 40 corresponding to the thyristor 12 and the right side of the wave form 40 corresponding to the thyristor 22. If the distribution buss and collector buss were fed uniformly, the curve of the current distribution would take the form illustrated in dotted lines at 42. Thus, the current flowing in the outer thyristors 12 and 22 would be greater than the current flowing in the center thyristors (not shown). However, due to the point of connection of the alternating current source to the distribution buss 24 by means of the buss connector 44 and the connection of the collection connector 46 and the collection buss 26, the current distribution takes the form indicated at curve 50. As is seen from the curve 50, the current carrying characteristics of the left hand thyristors 12, 14 are less than the current carrying characteristics of the right hand thyristors 20, 22 due to the fact that the reactive impedance of the left hand path is greater than the reactive impedance of the right hand path.

As was explained above, the generally low current in the center leg is due to the fact that the mutual inductance distribution of one leg relative to another differs depending on the position of the leg within the finite string. For example, the mutual inductance contribution to the reactive impedance at the center of the finite ladder is greater than it is at the outer legs (legs 12 and 22) because of the fact that the center legs are acted upon by a spring of legs on either side thereof, whereas the outer legs (legs 12 and 22) are acted on only by the parallelled legs inboard of the outside legs. Thus, the outside legs do not have a large mutual inductance acting thereon. Further, the manner in which the current is fed to the ladder network and the manner in which it is collected from the ladder network will create a discrepancy in the self inductance of the arrangement. Further, as will be seen from a description of FIGS. 3–7, this unequal current distribution is cured by the manner in which the alternating current buss, and the distribution and collection busses are interconnected, and the manner in devised. the end turns for the alternating current buss are dvised.

Figure 2:
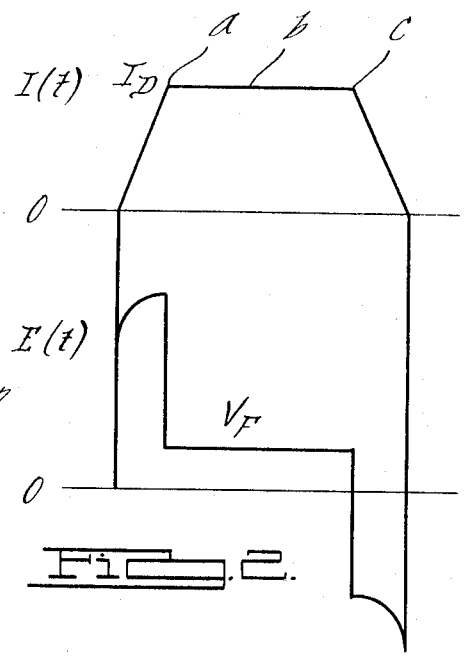
FIG. 2 is a current-voltage curve illustrating the current and voltage through and across the rectifier elements and particularly illustrating the commutation interval as the rectifier device is commutated into and out of conduction.

FIG. 2 is a typical current and voltage waveform illustrating the flow of current through any one leg of six phase power rectifier. The current waveform consists of the beginning commutation interval from time O to point a followed by the main conduction period b of constant current, followed by the ending commutation interval starting at point c. The voltage drop across the assembly consists of the forward drop across the devices, plus the inductive voltage drop due to the rate of change of current during the commutation intervals. In a typical rectifier, the forward drop $V_f$ is normally about 1.5 volts, while the inductive drop during commutation is several times that value. Since the voltage is the same for all parallel paths, the relative inductances will determine the rate of rise of current in each individual leg. Once established during commutation, there is very little redistribution of currents during interval b, since the differences in $V_f$ are very small. This means that variations in inductive effects are the main cause of unbalanced currents.

Figure 3:
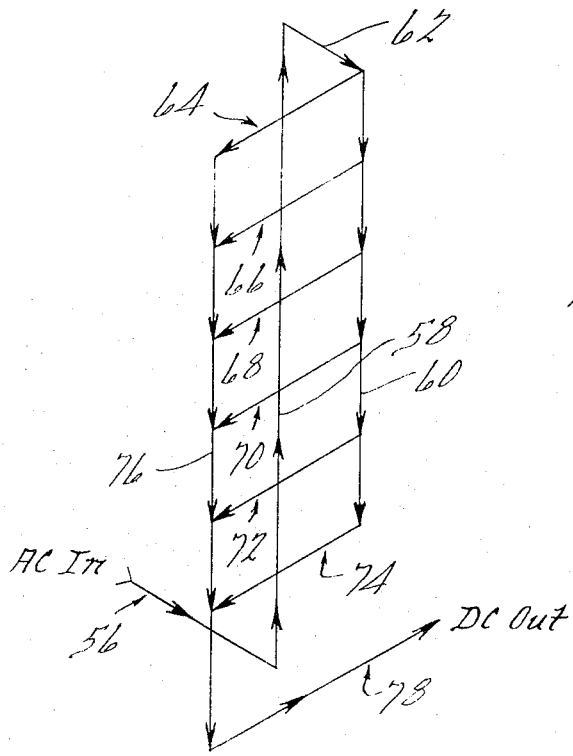
FIG. 3 is a schematic representation of the buss work contemplated to provide equal self inductance for each parallelled path of the finite string of rectifier elements.

Referring now to FIG. 3, there is illustrated a schematic representation of the bussing preferred to accomplish an equalization of the self inductance portion of the reactive impedance connected with the rectifier assembly illustrated. In FIG. 3, the alternating current is fed by means of an input buss 56, the buss 56 being generally horizontal and feeding a vertical alternating current buss 58. The vertical buss 58 is connected to a vertical distribution buss 60 by means of an interconnecting buss 62, the busses 58 and 60 being generally parallel. The distribution buss 60 is connected to one end of each of a plurality of controlled rectifier elements, with the associated buss work, represented as lines 64, 66, 68, 70, 72 and 74. Thus, a six leg ladder network is illustrated for the rectifier assembly to be discussed. The output side of each of the rectifier legs 64–74 are connected to a vertical collector buss 76, which buss is, in turn, connected to a horizontal D.C. output buss 78.

In the schematic representation, it is to be noted that the busses 58, 60 and 76 are positioned in space parallel to one another and the buss 58 is positioned to be equidistant from the busses 60 and 76. Thus, the busses 58, 60 and 76 form an isosceles triangle when viewed in plan view, the busses 58, 60 and 76 in plan view being representatively illustrated as points.

As is commonly known, the self inductance of any path, including one of the legs 64–74, is directly proportional to the area formed by the various interconnecting busses. For example, taking the single leg connection and its associated buss work for the leg 66, current flows from buss 56 through buss 58, through buss 62, through buss 60 to the leg 66. Current then flows down through the buss 76 to the D.C. output buss 78. Considering this path as a single continuous wire, it is seen that the wire forms an area, the flux created by current flowing in that wire being defined by an arrow normal to that area. To further visualize the area formed by this path, consider the complex curve defined by the path described as being a surface of a soap film if the integral wire were emersed in a soap solution. The surface formed would be a complex curve, but would define a certain area. Consider now a second path created by another leg, for example leg 68. This path would then be defined by the busses 56, 58, 62, 60, 68, 76 and 78. If this continuous wire were then emersed in a soap solution, the film would create a surface which would be identical in area to the surface described above with the exception that the transition from buss 60 to buss 76 would be separated by the vertical distance defined as the distance between legs 66 and 68. However, the areas would be identical. As is commonly known, the inductance of the path defined by these conductors is defined by the area and thus the inductance per path is constant. However, the mutual inductance for each path would be different due to the reasons described above. For a more complete description of the flux analysis described above, reference is made to *Electricity and Magnetism* by Oleg D. Jefimenko, 1966, Appleton-Century-Croft, Division of Meredith Publishing Co., pages 320 to 373.

Figure 4:
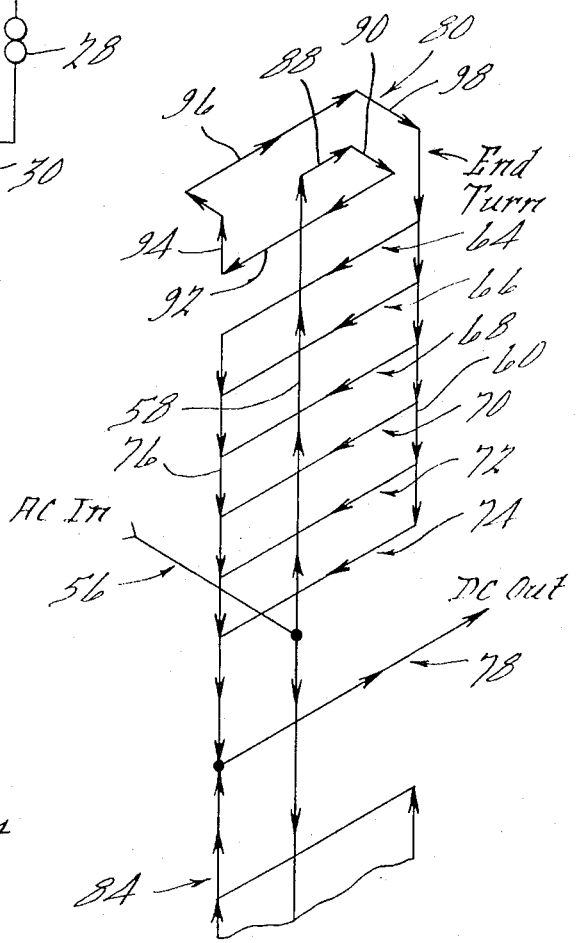
FIG. 4 is a schematic representation of the buss work contemplated to form the end turn and thereby simulate a field for an infinite string of rectifier devices.

The solution to this mutual inductance problem is illustrated in FIG. 4 wherein an end turn 80 is created by the alternating current buss in the configuration shown to create the flux which would be created by an infinite number of legs above the uppermost half of rectifier legs. More specifically, the alternating current input buss, again defined by reference numeral 56, is connected to the A.C. buss 58 which is vertically disposed. The reference numerals from FIG. 3 have been utilized in conjunction with FIG. 4 to illustrate that the constant self inductance features of FIG. 3 have also been incorporated in the solution of FIG. 4 and is compatible therewith. Thus, the distribution buss 60 is connected to a plurality of rectifier legs 64 to 74, which in turn are connected to a collection buss 76 feeding a direct current output buss 78. The representation of FIG. 4 also includes a symmetrically arranged lower half of the assembly, which allows placement of an end turn on both ends of a finite, parallel ladder assembly, and thus create the flux to simulate an infinite string for the lower half. It is to be understood that the lower portion 84 of the system is identical to that to be described in conjunction with the upper portion.

The alternating current buss 58 is connected to the end turn 80 which is disposed between the A.C. buss 58 and the distribution buss 60 to replace the direct connection of these two busses. The end turn includes a horizontal buss 88 which is connected to a second horizontal buss 90 disposed 90° therefrom and a third horizontal buss 92 which is positioned parallel to and in close proximity to the upper leg 64. It is to be noted that the entire half wave of alternating current flows through the buss 92. The current in buss 92 is in the same direction as upper leg 64. The current in busses 96 and 88 is in the opposite direction, but these are located at a greater distance than buss 92. The net field produced is similar to that which would be created by an infinite number of parallelled legs disposed above the upper leg 64. The remaining connections to buss 60 are created by vertical buss 94 and horizontal buss 98. These latter busses being insignificant in effect as they are perpendicular to the direction of legs 64, 66, 68, 70, 72 and 74.

Referring now to FIGS. 5, 6 and 7, there is illustrated a preferred embodiment of a rectifier system incorporating the features of the present invention. For purposes of simplicity, the reference numerals used in conjunction with the description of FIGS. 3 and 4 have been also used in the illustrations of FIGS. 5, 6 and 7 to correlate the various elements of the Figures.

Particularly, the alternating current input buss 56 comprises a connector bar 100 formed with a plurality of apertures 102 which are utilized to connect the alternating current supply to the rectifier system. The buss 100 is then connected to a generally vertical buss 104 which connects the connector buss 102 to the horizontal portion of the alternating current buss 58. The remainder of buss 58 is vertically disposed and is connected (as by welding) at an outer surface thereof to the buss segment 88. This is best illustrated in FIG. 7. The buss 88 is generally a G shaped piece of metal, the short leg 88 thereof being connected to the buss 58 and the leg ninety degrees thereto connecting the leg 88 with the main flux producing leg 92. As best seen in FIG. 5, the buss 92 is positioned in close proximity to the leg 64, the current flowing in the direction of the arrow illustrated in FIG. 7. Thus, the current flows in the same direction as current is flowing in the leg 64. The buss element 92 is then bent at a ninety degrees to be connected to an L shaped buss element stacked on top of the buss 92, the busses 74 and 92 being welded together.

The long leg of the buss 96 is connected to the distribution buss 60 by means of an interconnecting metallic element 98, the various elements 96, 98, 60 being welded together to form a low resistance electrical connection.

Referring back to FIG. 5, the buss 60 supplies distributive current to the plurality of legs 64–74. Each of the legs 64–74 contains a fuse-delay reactor assembly 114–124 including a generally cylindrically shaped fuse and a delay reactor illustrated immediately to the rear of the fuse in FIG. 5. The outputs of the reactors are connected through the fuse elements to a plurality of thyristor elements 134–144, respectively, by means of a plurality of parallel flexible connectors. It is to be noted that the current flows from the distribution buss 60, through the delay reactors to the collector buss 76 through the thyristor elements 134–144. The delay reactors are utilized to store a voltage for a short period of time to permit all of the thyristors connected in parallel to trigger together. If one thyristor triggered ahead of all of the rest of the thyristors, the voltage between the distributor and collector busses would be insufficient to fire the remaining thyristors.

The thyristors 134–144 are suitably fastened, as by means of the U-bolt clamp illustrated or some other stud connection, to the collector buss 76. The collector buss 76 is, in turn, connected to the D.C. output buss 78.

It will be noted that the busses 60 and 76 are generally parallel, one relative to the other, and the two busses 60, 76 are parallel to the flat face of the A.C. input buss 58. Thus, the above described isosceles triangle is formed for the effective geometric center of the three busses involved. In this way, the self inductance of the arrangement is minimized. Further, it will be noted that the area enclosed within the perimeter defined by the busses 58, 90, 92 and 74 is very small to minimize the self inductance flux created by the various busses.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a power converter system for converting an alternating source of electrical energy for use by a direct current load, the converter system having a plurality of rectifier elements connected in a finite system of parallel legs connected between said source and load, the improvement comprising means for equalizing the flux created by the self impedance of each leg having current flow including an alternating current buss connected to the source for feeding energy to the rectifier system, a distribution buss connected to the alternating current buss at one point thereof and connected to the rectifier elements at various points along the length thereof, and a collection buss connected to the load at one point thereof and to the rectifier elements at various points along the length thereof, said alternating current buss, said distribution buss and said collection buss forming an isosceles triangle when viewed axially of said busses.

2. The improvement of claim 1 wherein said alternating current buss, said distribution buss and said collection buss are generally parallel.

3. The improvement of claim 2 wherein said isosceles triangle encloses a minimal area.

4. The improvement of claim 2 wherein said alternating current buss has a longitudinal dimension in a first direction, said equalizing means further including collection buss means connecting said alternating current buss and said distribution buss at one end of each of said busses, said rectifier elements being mounted on said collection buss, and conductor means interconnecting said distribution buss and said rectifier elements.

5. The improvement of claim 4 wherein said equalizing means further includes delay reactor means mounted on said distribution buss, each leg including one of said delay reactors.

6. The improvement of claim 5 further including a direct current output buss connected to said collection buss.

7. In a power converter system for converting an alternating current source of electrical energy for use by a direct current load, the converter system having a plurality of rectifier elements connected in a finite string of parallel legs connected between said source and load, the improvement comprising means for equalizing the flux created between the mutual impedance of each leg having current flow, said equilizing means including current carrying buss means mounted in proximity to at least one end leg of said finite string, said buss means carrying current and creating a field to simulate an infinite string of parallel legs above said end leg.

8. The improvement of claim 7 wherein said system includes an alternating current buss connected to the source for feeding energy to the rectifier system, and a distribution buss connected to the alternating current buss at one end thereof to one end of said alternating current buss through said equalizing means.

9. The improvement of claim 8 wherein said alternating current buss and said distribution buss are generally parallel, said connection between said alternating current buss and said distribution buss being formed by a connection buss, said connection buss forming a loop between said alternating current buss and said distribution buss and having a leg parallel to said upper leg of said rectifier elements.

10. The improvement of claim 9 wherein said rectifier elements are connected in a parallel string and being positioned to be mechanically parallel, one relative to the others.

11. The improvement of claim 10 wherein said equalizing means is formed as an end turn between said alternating current buss and said distribution buss, said end turn forming a five segment helix when viewed along the longitudinal axis of said alternating current buss and said distribution buss, said first, third and fifth segments being parallel with each other.

12. The improvement of claim 11 wherein said fifth segment is longitudinally spaced from said third element in a direction along the longitudinal axis of said alternating current and distribution busses.

13. The improvement of claim 12 wherein said fifth segment is spaced a large distance from said third segment relative to the spacing between said fifth segment and said first segment.

14. The improvement of claim 2 further including means for equalizing the flux created between the mutual impedance of each leg having current flow, said equalizing means including current carrying buss means mounted in proximity to at least one end leg of said finite string, said buss means carrying current and creating a field to simulate an infinite string of parallel legs above said end leg.

15. The improvement of claim 14 wherein said distribution buss is connected to the alternating current buss at one end thereof to one end of said alternating current buss through said equalizing means.

16. The improvement of claim 15 wherein said connection between said alternating current buss and said distribution buss being formed by a connection buss, said connection buss forming a loop between said alternating current buss and said distribution buss and having a leg parallel to said upper leg of said rectifier elements.

17. The improvement of claim 16 wherein said rectifier elements are connected in a parallel string and being positioned to be mechanically parallel, one relative to the others.

18. The improvement of claim 17 wherein said equalizing means is formed as an end turn between said alternating current buss and said distribution buss, said end turn forming a five segment helix when viewed along the longitudinal axis of said alternating current buss and said distribution buss, said first, third and fifth segments being parallel with each other.

19. The improvement of claim 18 wherein said fifth segment is longitudinally spaced from said third element in a direction along the longitudinal axis of said alternating current and distribution busses.

20. The improvement of claim 19 wherein said fifth segment is spaced a large distance from said third segment relative to the spacing between said fifth segment and said first segment.

* * * * *